United States Patent [19]

Hartwimmer et al.

[11] 4,267,098
[45] May 12, 1981

[54] STABILIZED COPOLYMERS BASED ON ETHYLENE AND TETRAFLUOROETHYLENE, AND PROCESSES FOR THEIR PREPARATION

[75] Inventors: Robert Hartwimmer; Jürgen Kuhls, both of Burghausen, Salzach, Fed. Rep. of Germany

[73] Assignee: Hoechst Aktiengesellschaft, Fed. Rep. of Germany

[21] Appl. No.: 4,708

[22] Filed: Jan. 19, 1979

[30] Foreign Application Priority Data

Jan. 24, 1978 [DE] Fed. Rep. of Germany ....... 2802916

[51] Int. Cl.³ ............................ C08K 5/51; C08K 5/52
[52] U.S. Cl. ..................... 260/45.75 W; 260/29.6 F; 260/45.7 P; 260/45.7 PH; 260/45.75 R; 174/110 FC; 428/379; 428/389
[58] Field of Search ............... 260/45.7 PH, 45.75 W, 260/29.6 F, 45.7 P; 526/255; 174/110 FC; 428/379, 389

[56] References Cited

U.S. PATENT DOCUMENTS

| | | | |
|---|---|---|---|
| 2,879,257 | 3/1959 | Walter et al. | 260/45.75 W |
| 3,219,605 | 11/1965 | Klemchuk | 260/45.75 W |
| 3,303,154 | 2/1967 | Hirose et al. | 526/255 |
| 3,454,517 | 7/1969 | Neros et al. | 260/45.75 W |
| 3,700,627 | 10/1972 | Miller | 260/45.75 W |
| 3,745,145 | 7/1973 | Khattab et al. | 260/45.75 W |
| 3,870,689 | 3/1975 | Modena et al. | 526/255 |
| 3,893,971 | 7/1975 | Ukihashi et al. | 526/255 |
| 4,110,308 | 8/1978 | Abe et al. | 260/42.22 |
| 4,147,683 | 4/1979 | Vassiliou et al. | 260/29.6 F |

*Primary Examiner*—Maurice J. Welsh
*Assistant Examiner*—R. A. White
*Attorney, Agent, or Firm*—Connolly and Hutz

[57] ABSTRACT

Mixtures of (a) copolymers of ethylene and tetrafluoroethylene, which in addition optionally contain up to 10 mole % of units of at least one ethylenically monounsaturated monomer copolymerizable with tetrafluoroethylene, with (b) phosphorus acids which in one of their tautomeric forms contain 2 or 3 oxygen atoms and 1 or 2 hydrogen atoms directly bonded to each phosphorus atom, or with salts of such acids, are described. These mixtures possess improved heat stability and can, where appropriate with interpolation of a melt granulation process, be used, in particular, for the coating of metals. Component (b) is added to the copolymer (a) in the dry form or preferably in the form of a solution during working up, and in particular is added either to the pulverulent copolymer or, more especially, to a moist product, isolated from dispersions, after the last washing process.

12 Claims, No Drawings

STABILIZED COPOLYMERS BASED ON ETHYLENE AND TETRAFLUOROETHYLENE, AND PROCESSES FOR THEIR PREPARATION

The invention relates to stabilized ethylene-tetrafluoroethylene copolymers which optionally contain up to 10 mole % of other ethylenically unsaturated comonomers, to processes for their preparation, and to their use.

German Offenlegungsschrift No. 2,114,440 discloses the preparation of vinylidene fluoride copolymers having improved heat-aging properties by polymerization in an aqueous medium in the presence of a catalyst system comprising a water-soluble inorganic peroxide compound and a water-soluble hypophosphite. The process permits the production of copolymers which in addition to vinylidene fluoride can contain a plurality of fluorine-containing, ethylenically unsaturated comonomers, but no comonomers free from fluorine, for example ethylene. In Examples 5 and 7 to 9, sodium hypophosphite is subsequently added to a copolymer prepared in accordance with this process, and in doing so it is found that the heat-aging properties are adversely affected.

Further, German Offenlegungsschriften Nos. 2,362,254 and 2,638,054 disclose ethylene-tetrafluoroethylene copolymer compositions which contain from 0.001 to 5% by weight of α-aluminum oxide or more than 0.1 ppm of copper or of a copper compound, relative to the weight of the ethylene-tetrafluoroethylene copolymer. As is demonstrated below, in comparative experiments, the known stabilized ethylene-tetrafluoroethylene copolymer compositions are inferior in respect of stability to the products according to the invention described below.

It is the object of the present invention to provide ethylene-tetrafluoroethylene copolymers, which optionally contain further polymerized comonomers and which exhibit improved stability compared to products of the prior art, in particular in order substantially to avoid, or at least significantly to reduce, the undesired thermal decomposition which occurs during processing (the processing in general taking place at above 300° C.), above all in the presence of atmospheric oxygen, and which leads to discoloration of the products formed, with simultaneous blistering and decrease in their mechanical strength characteristics.

This object is achieved by a mixture of (a) 99.999 to 98% by weight, relative to the mixture, of at least one ethylene-tetrafluoroethylene copolymer which in addition to polymerized ethylene and tetrafluoroethylene units can contain further polymerized units derived from monomers which are copolymerizable with tetrafluoroethylene, and (b) 0.001 to 2% by weight, relative to the mixture, of at least one phosphorus acid, which in one of its tautomeric forms contains 2 or 3 oxygen atoms and 1 or 2 hydrogen atoms directly bonded to each phosphorus atom, and/or of at least one salt of this acid, which mixture can contain further admixed substances.

If the mixture contains substantially less than 0.001% by weight of component (b), a sufficient stabilizing action is in general no longer found. At contents above 2% by weight, the stabilizing action in principle remains preserved as the amount added increases, but in fact decreases slightly, and in addition other undesirable phenomena increasingly manifest themselves, so that at contents above 2% by weight the disadvantages in general outweigh the advantages.

Advantageously, a copolymer which consists of 40 to 70 mole %, relative to the copolymer, of polymerized ethylene units is used for the mixture. Such copolymers in general have a melt index, measured at 300° C. and 11 kg load, of 5 to 400, preferably 10 to 300 and especially 15 to 250 g/10 min. They are particularly suitable for further processing, in the thermoplastic state, to give semi-finished goods and finished articles.

In addition to the copolymers built up exclusively of ethylene units and tetrafluoroethylene units, preferred copolymers are those which consist of polymerized ethylene units and tetrafluoroethylene units and of up to 10 mole %, relative to the copolymer, of further polymerized units which are derived from at least one ethylenically unsaturated, in general ethylenically mono-unsaturated, monomer which is copolymerizable with tetrafluoroethylene and does not act as a telogen. Such comonomers are either those which introduce side chains, containing at least one carbon atom, into the copolymer, or are ethylene derivatives which are monosubstituted or polysubstituted by chlorine and/or bromine and/or up to trisubstituted by fluorine, for example vinyl fluoride, vinylidene fluoride or trifluorochloroethylene. Such copolymers are easily and inexpensively accessible and/or have a particularly advantageous combination of physical properties and processing properties.

For component (b) of the mixture to display its action according to the invention, it is advantageous if this component is present in a very homogeneous finely divided state in the mixture with the copolymer. This can advantageously be achieved if component (b) of the mixture is, as explained in more detail below, added in aqueous solution. Hence, preferred components (b) are materials which are soluble in water at 20° C. to the extent of at least 0.01% by weight, in particular to the extent of 0.1% by weight. Because of easy accessibility, it is preferred to use, as component (b), at least one salt whereof the cation is ammonium and/or a metal cation of main groups 1 to 3 of the periodic table of the elements. Such cations are, in particular, sodium, potassium, magnesium, calcium, strontium, barium and aluminum.

In addition to these preferred salts it is however also possible to use salts with other cations, for example zinc or manganese, as well as the free acids. Frequently, it is advantageous to use acid salts since their solubility in water is in most cases greater than that of the neutral salts. Instead of the salts which contain cations of one type only it is also possible to use salts which contain several cations, for example so-called double salts. Equally, it is also possible to use mixtures of 2 or more individual compounds (salts or acids), provided their amount and type fall within the definition of component (b) given above.

Equally, the mixtures according to the invention can contain several copolymers as component (a), provided these copolymers fall, in respect of type and amount, within the definition of component (a) given above.

Because of its good efficiency, good stability and easy accessibility, it is preferred to use, as component (b), at least one salt of phosphorous acid, in particular a magnesium, calcium or aluminum salt of this acid.

In addition to the preferred phosphorous acid, also referred to as phosphonic acid $H_2(HPO_3)$, and its salts, it is possible to employ further acids or salts in which the phosphorus is in the +3, +2 or +1 oxidation state, for example derivatives of diphosphorous acid $H_2(H_2P_2O_5)$, of hypodiphosphorous acid $H_2(H_2P_2O_4)$ and of hypophosphorous acid, also referred to as phosphinic acid, $H(H_2PO_2)$. These acids are in general used in the form of the alkali metal salts or alkaline earth metal salts, above all the sodium, potassium or calcium salt.

The copolymers employed as component (a) are prepared, for example, in accordance with the processes described in the following publications: German Offenlegungsschriften Nos. 1,595,167, 1,770,440, 1,806,097, 1,957,963, 2,037,028, 2,132,463, 2,233,288, 2,444,516 and 2,718,747 and U.S. Pat. Nos. 2,468,664, 3,303,154 and 3,444,148. Comonomers suitable for the preparation are described, for example, in German Patent Specification No. 1,162,829, German Offenlegungsschriften Nos. 2,517,357 and 2,531,511, and U.S. Pat. Nos. 3,318,854 and 4,036,802.

Monomers described as copolymerizable with tetrafluoroethylene are those which are capable, by virtue of their ethylenically unsaturated group, of forming an integral constituent of the main polymer chain consisting of tetrafluoroethylene units and ethylene units. Such copolymerizable monomers must not prevent the copolymerization reaction.

Examples of such copolymerizable monomers are the fluorinated vinyl monomers of the general formulae $R-CF=CF_2$ and $ROCF=CF_2$, wherein R denotes an organic group which can be cyclic or acyclic and/or can contain an aromatic nucleus, and which possesses 2 to 15 carbon atoms. In general, the organic group is highly fluorine-substituted, that is to say it has at least 1 fluorine atom on each carbon atom. However, the compounds can also contain other atoms, such as chlorine atoms, as monosubstituents on a carbon atom.

Hydrogen can be present in the group in a position in which it is substantially inert, such as in the $\omega$-position, as part of the $-CF_2H$ group or as part of the $-CH_3$ group. Equally, the compounds can contain other atoms, such as sulfur and nitrogen, in such radicals as, for example, sulfone or amide groups.

Examples of fluorine-substituted monomers which can be used according to the invention are the fluorine-substituted $\alpha$-monoolefins, such as hexafluoropropene, perfluorobut-1-ene, perfluoroisobutene, perfluoropent-1-ene, perfluorohept-1-ene, $\omega$-hydroperfluorooct-1-ene, trifluoroethylene, vinylidene fluoride, vinyl fluoride, pentafluoropropene and also fluorine-substituted $\alpha$-monoolefins which in addition to fluorine contain other halogen atoms, such as, for example, trifluorochloroethylene, 1,1-difluoro-2,2-dichloroethylene, 1,2-difluoro-1,2-dichloroethylene, trifluorobromoethylene and 1-chloro-2,2-difluoroethylene, as well as the fluorine-substituted vinyl-ethers of the general formula $XCF_2(CF_2)_nOCF=CF_2$, in which x denotes a fluorine, hydrogen or chlorine atom and n is an integer from 1 to 7. Examples of such vinyl-ethers are perfluoro-(ethyl-vinyl)-ether, perfluoro-(propyl-vinyl)-ether and 3-hydroperfluoro-(propyl-vinyl)-ether. Another fluorine-substituted vinyl-ether which can be used is perfluoro-(2-methylene-4-methyl-1,3-dioxolane), which is described in U.S. Pat. No. 3,308,107. The organic group (R) in the formulae described above need not be highly fluorine-substituted if a certain degree of heat resistance of the copolymer can be dispensed with. Examples of monomers which are not highly fluorine-substituted and which can be used are the fluorohydrocarbon-vinyl monomers having a fluorine-substituted vinyl group and the hydrocarbon-vinyl monomers having a fluorine-substituted vinyl group, for example the monomers of the composition $CF_3(CF_2)_mCH_2OCF=CF_2$, wherein m denotes an integer from 0 to 6, and those of the composition $CH_3(CH_2)_nOCF=CF_2$, wherein n denotes an integer from 1 to 7. These vinyl-ethers are prepared by reaction of the corresponding sodium alcoholate with tetrafluoroethylene under the conditions described in U.S. Pat. No. 3,159,609. Examples of these vinyl-ethers are n-butyl-trifluorovinyl-ether and 2,2,3,3,3-pentafluoropropyl-trifluorovinyl-ether.

Another group of vinyl monomers which can be used are the vinyl esters of the general formula

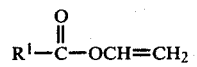

in which $R^1$ has the meaning given above for R, with the difference that $R^1$ need only contain one carbon atom. An example of such a vinyl monomer is vinyl acetate.

Further vinyl monomers in which the vinyl group is a hydrocarbon group and which can be used in accordance with the invention are the vinyl monomers of the general formulae

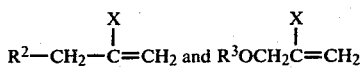

wherein $R^2$ and $R^3$ denote perfluoroalkyl groups or chlorofluoroalkyl groups with 1 to 7 carbon atoms and X denotes a hydrogen atom or a methyl group. The simplest of these vinyl monomers are prepared by reacting hexafluoroacetone with propylene in the presence of aluminum chloride or by reacting hexafluoroacetone with allyl bromide in the presence of cesium fluoride. A further description of vinyl monomers of these general formulae, and of a process for the preparation of the monomers, is to be found in Knunyants, Bull. Acad. Sci., UdSSR Div. Chem. Sci. 355 (1962) and in Netherlands Patent Application 6,602,167. Typical groups $R^2$ and $R^3$ for these monomers are the perfluoroalkyl groups, such as $CF_3CF_2CF_2-$ and $(CF_3)_2CF-$, as well as the chlorofluoroalkyl groups, such as $(CClF_2)_2CF-$. $R^2$ can also be a secondary or tertiary halogen-substituted alcohol group, such as the $-(CClF_2)_2COH$ or $-(CF_3)_2COH$ group, as described in U.S. Pat. No. 3,444,148. Examples of these vinyl monomers are 4,4,4-trifluorobut-1-ene, 4,4,5,5,5-pentafluoropent-1-ene,1,1,1-trifluoro-2-(trifluoromethyl)-4-penten-2-ol, 1-chloro-1,1-difluoro-2-(monochlorodifluoromethyl)-4-penten-2-ol, 1,1,1-trifluoro-2,2-(trifluoromethyl)-4-methyl-4-penten-2-ol, 4-(trifluoromethyl)-4,5,5,5-tetrafluoropent-1-ene, allyl-heptafluoroisopropylether, allyl-1,3-dichloropentafluoroisopropyl-ether, allylheptafluoropropyl-ether, allyl-pentafluoroethyl-ether and 2-methylallyl-heptafluoroisopropyl-ether.

Further, it is possible to employ vinyl monomers of the general formula

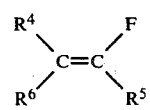

which have not yet been mentioned above and wherein $R^4$ denotes F or H, $R^5$ denotes F or Cl and $R^6$ denotes —Cl, —$R_F$, —$OR_F$, —$R_FH$, —$OR'_FH$, —$R'_FCl$, —$OR'_FCl$ or

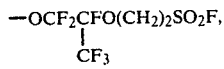

wherein $R_F$ denotes a straight-chain perfluoroalkyl radical with 1 to 5 carbon atoms and $R'_F$ denotes a straight-chain perfluoroalkylene radical (perfluorinated alkanediradical) with 1 to 5 carbon atoms, in which the substituent so designated is an omega substituent, and, if $R_5$ is F, $R_4$ and $R_6$ together can be the following radical

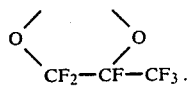

Further, it is possible to use vinyl monomers of the general formula

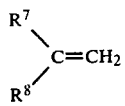

wherein $R^7$ and $R^8$ independently of one another denote —$CF_3$ or —$CClF_2$.

In addition, it is possible to employ vinyl monomers of the general formula

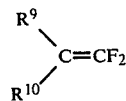

which have not yet been mentioned above and wherein $R^9$ denotes F, H or Cl and $R^{10}$ denotes $R_F$, —$OR'_FX$ or —$OR'_FX$, wherein $R_F$ is a straight-chain perfluoroalkyl radical with 1 to 5 carbon atoms, $R'_F$ is a divalent, straight-chain perfluoroalkylene radical with 1 to 5 carbon atoms, in which the valencies are at either end of the straight chain and X is H or Cl, and, if $R^9$ is F, $R^{10}$ can also be either

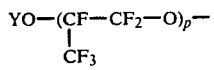

wherein p is 1 or 2 and Y is a perfluoroalkyl radical with 1 to 9 C atoms, or

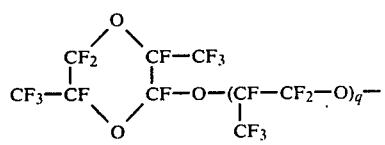

wherein q is 0, 1 or 2, with the proviso that $R^9$ and $R^{10}$ can also together form the divalent radical of the formula

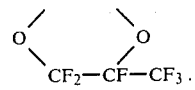

Specially preferred monomers are hexafluoropropene and perfluoro-(propyl-vinyl)-ether.

The ethylene-tetrafluoroethylene copolymer can in general contain 0.1 to 10 mole %, relative to the copolymer, of further polymerized units which are derived from one or more of the monomers listed in more detail above, which are copolymerizable with tetrafluoroethylene.

The copolymers are in general prepared in emulsion or suspension in a liquid medium which frequently consists predominantly of water. It can however also entirely or partially consist of solvents such as, for example, tert.-butanol, or halogenated hydrocarbons, such as 1,1,2-trichloro-1,2,2-trifluoroethane. The remaining polymerization parameters are to be found in the publications referred to above.

As already explained above, the mixture according to the invention should contain 0.001 to 2% by weight, relative to the mixture, of component (b). Preferred mixtures are those which contain 0.01 to 2% by weight of component (b) and 99.99 to 98% by weight of component (a). Particularly advantageous results are achieved if the mixture contains 0.02 to 0.5% by weight of component (b) and 99.98 to 99.5% by weight of component (a).

Further materials may be present in the mixture according to the invention, for example glass fibers, pigments, such as titanium dioxide, silicon dioxide, aluminum oxide, chromium oxide, cobalt-containing pigments, graphite, carbon black, talc, cadmium sulfide and iron oxide, and also finely divided metals or alloys, for example nickel, chromium-nickel steel and bronze, as well as other fluorine-containing polymers and/or copolymers, for example polytetrafluoroethylene, and also residues of emulsifiers, dispersion stabilizers, catalysts and other auxiliaries used in the preparation of component (a) of the mixture. The mixture according to the invention can also contain organic solvents, such as gasoline, chlorinated hydrocarbons, aliphatic alcohols, ethers, ketones or esters with 1 to about 8 carbon atoms, and also water; for example, component (a) of the mixture can be dispersed in water by means of an added known dispersant, and component (b) of the mixture can be present in solution in this water. Admittedly, in that case, care must be taken that after removal of the water or other solvent, before exposing the mixture according to the invention to heat, sufficient amounts of component (b) remain in this mixture. This can be achieved, for example, by evaporating the water or solvent under mild conditions, if appropriate using reduced pressure.

The surprisingly good heat-stabilizing action of component (b) essentially manifests itself in conjunction with ethylene-tetrafluoroethylene copolymers. A lesser effect is in part also observed with tetrafluoroethylene copolymers which do not contain ethylene, for example in the case of those which in addition to tetrafluoroethylene contain hexafluoropropene and/or perfluorovinyl ethers and/or vinylidene fluoride.

Advantageously, component (b) of the mixture is only added to component (a) of the mixture after the preparation of the latter. Advantageously, this can already be done when working up the completely polymerized emulsion or suspension. Component (b) is conveniently added in a finely divided form, having a mean particle size of about 10 to about 100μ, preferably 30 to 60μ. Component (b) can be added dry, if it does not dissolve after addition, in a finely ground form or as a suspension or emulsion in a liquid, for example water, but is preferably added in the form of an aqueous solution. This solution can for example be sprayed onto the pulverulent component (a) by means of nozzles or other known atomizing devices, whilst component (a) is advantageously agitated by stirring, paddle agitation, fluidizing, trickling under gravity or similar methods. Component (b) can furthermore also only be formed in situ after addition of the appropriate starting materials, for example by a precipitation reaction, in which component (b) is precipitated onto the particles of component (a) or is adsorbed by these particles after precipitation in the aqueous liquor.

In a particularly preferred embodiment, component (b) is added to the copolymer after the last washing process, in the course of working up—which can for example take the form of a wet granulating process—and is added as an 0.01 to 3% strength by weight, preferably 0.02 to 0.75% strength by weight and especially 0.04 to 0.6% strength by weight aqueous solution. The moist product obtained after the last washing in general contains 40 to 60% by weight, relative to moist product, of copolymer, with the remaining 60 to 40% by weight consisting of wash liquid (in general water). In order to achieve good distribution of component (b) on the copolymer, at most 1 part by weight, advantageously only 0.01 to 0.5 part by weight and especially 0.1 to 0.3 part by weight of moist product should be treated with 1 part by weight of the aqueous solution, whilst advantageously ensuring intimate mixing by stirring. The excess part of this aqueous solution, that is to say the part which is not required in order to obtain a moist product containing about 40 to 60% by weight, preferably 50 to 55% by weight, of copolymer, is subsequently separated from the copolymer by filtration under slight suction, by decanting, by filtering or by similar operations. The moist product thus obtained is subsequently dried at temperatures of up to 220° C., if appropriate under reduced pressure. This drying is advantageously carried out in an inert gas atmosphere, for example a nitrogen atmosphere, when operating at higher temperatures, above 50° and up to 100° C., and particularly if there is a danger that a major amount of component (b) may be converted, for example by the action of atmospheric oxygen, into a compound in which the phosphorus has a higher oxidation state than +3 (see, in this context, the list of the oxidation states of phosphorus in various phosphorus acids in Hollemann-Wiberg, Lehrbuch der anorganischen Chemie (Textbook of Inorganic Chemistry), 71–80th edition, 1971, page 399, published by de Gruyter).

For the particularly preferred process described above, it is also possible to employ a dry copolymer, or a copolymer wherein the content of wash liquid is other than 40 to 60% by weight. Equally, the moist product obtained after separating off the aqueous solution with which the copolymer has been treated can have a copolymer content other than 40 to 60% by weight. In these cases, the concentration of component (b) in the aqueous solution must be adapted to the changed circumstances so that after drying a copolymer containing 0.001 to 2% by weight of component (b) is obtained.

The amount of component (b) which is employed for the treatment in order to achieve a particular concentration—which should be between 0.001 and 2% by weight—in the dry end product can be calculated, for example, in accordance with the following formula:

$$G_b = \frac{K(G_1 + F_1) \cdot (G_p - F_1)}{100 \cdot F_2}$$

in which the symbols have the following meaning (all amounts being amounts by weight, for example in g):
$G_b$ = amount of component (b) employed
$G_1$ = amount of treatment solution employed
$G_p$ = amount of moist product employed, containing the copolymer
$F_1$ = amount of the water-miscible constituents in the moist product employed
$F_2$ = amount of the constituents in the moist end product which are volatile under the drying conditions
$K$ = desired concentration of component (b) in the dry end product in [% by weight]

For further processing, the mixture of components (a) and (b), thus obtained, is advantageously subjected to a melt granulation process. For this purpose, the mixture is fused in an extruder and extruded to form a strand, and this strand is chopped into granules, the size of which suits the further processing method. In addition to the improvement in processing properties, such as free-flowing character, ease of metering and increase in bulk density, this procedure achieves more homogeneous distribution of the admixed additives, that is to say also of the heat-stabilizers comprising component (b).

If a copolymer dispersion, of which the liquid phase predominantly consists of water, is to be produced, component (b) is advantageously dissolved in the water used for the dispersion. It can also be added to the dispersion in a finely ground form and be co-dispersed.

The copolymers stabilized according to the invention are suitable for the production of moldings and semi-finished goods by processing by the compression molding, injection molding and extrusion methods, and are also suitable for coatings on metallic surfaces or on organic substrates which are resistant to temperatures above about 200°–250° C. They are particularly suitable for coating wires which are to be exposed to high temperatures.

The mixtures according to the invention exhibit a surprisingly high heat stability, characterized by a low weight loss, little frothing and little or no discoloration, coupled with constant good mechanical properties such as tensile strength and elongation at break. As a result of there being little frothing, the formation of blisters and cavities during thermoplastic processing, for example on extrusion to produce moldings, is largely avoided. Because of the low weight loss on heat exposure, only extremely small amounts of corrosive and in part toxic gases or vapors can be formed from the fluorine-containing copolymers. This is a substantial advantage both in respect of wear of the processing machinery and from the point of view of works hygiene.

In the Examples and Comparative Experiments which follow, the preparation and properties of the stabilized copolymers according to the invention are explained in more detail and compared with copolymers stabilized according to the prior art. For greater compactness, the results of the measurements are shown in tabular form.

Comparative Experiment E is a blank experiment which was carried out without adding a stabilizer.

TABLE 1

| Example or Comparative Experiment | Material added | % by weight, based on ETFE | Test 1 Frothing | Test 1 Color | Test 2 Color | Test 2 % weight loss |
|---|---|---|---|---|---|---|
| A | CuO | 0.2 | severe | 5 | 5-6 | 0.33 |
| B | CuO | 1.0 | severe | 5-6 | 6 | 0.64 |
| 1 | $Mg(H_2PO_3)_2$ | 0.2 | very slight | 2 | 2 | 0.16 |
| 2 | $Mg(H_2PO_3)_2$ | 1.0 | slight | 3 | 2 | 0.40 |
| C | $\alpha\text{-}Al_2O_3$ | 0.1 | slight | 4-5 | 2 | 0.63 |
| D | $\alpha\text{-}Al_2O_3$ | 0.2 | slight | 4-5 | 2 | 0.54 |
| E | — | — | severe | 4-5 | 3 | 1.02 |

EXAMPLES 1 AND 2 AND COMPARATIVE EXPERIMENTS A TO E

In each case an ethylene-tetrafluoroethylene copolymer which contains 22% by weight=50 mole % of polymerized ethylene units and, in addition to tetrafluoroethylene units, 2 mole % (relative to polymer) of polymerized hexafluoropropene units, and which has been ground to 50μ mean particle diameter, is used. The materials listed in Table 1, in the concentrations shown in the same table, are added to this copolymer. These materials have beforehand been ground to a mean particle size of about 50μ. After they have been added, the materials are mixed thoroughly and in each case 2 grams of the mixture formed are heated, whilst exposed to air, for one hour at 340° C. The frothing and discoloration which hereupon occurs is assessed visually in accordance with the following color number scale (Test 1).

| Color | Assessment number |
|---|---|
| black | 6 |
| dark brown | 5 |
| light brown | 4 |
| dark yellow | 3 |
| light yellow | 2 |
| colorless | 1 |

Strands about 5 cm long are produced from a further part of the mixture with the aid of a melt index apparatus having the following nozzle dimensions: length/diameter 8/2.08 mm, plunger surface area: 0.64 cm²; the strands are produced at 300° C. under a pressure of 11 kp/cm². These strands are next weighed and then stored for 120 hours at 200° C. (Test 2). After this storage, the discoloration is determined visually and the weight loss in percent is determined by renewed weighing. The values found are listed in Table 1 below, wherein Comparative Experiments A and B correspond to the process in German Offenlegungsschrift No. 2,638,054 and Comparative Experiments C and D to the process of German Offenlegungsschrift No. 2,362,254.

EXAMPLE 3 AND COMPARATIVE EXPERIMENTS F TO H 400 gram portions of the copolymer mentioned in Example 1, the copolymer being in the moist form as obtained after the polymerization and the last washing process, and containing about 50% by weight of water, are stirred with 1,000 ml of an aqueous solution of 2.4 grams of the materials listed in Table 2, for 5 minutes at 20° C. The solid is then separated from the liquid by filtration under slight suction. A moist product containing about 50% by weight of constituents which are volatile under the drying conditions is obtained, and is then dried under nitrogen for 12 hours at 200° C. In the case of Comparative Experiment H, the treatment of the moist copolymer with the aqueous solution is omitted and the moist product is dried directly (blank experiment). Tests 1 and 2, as described in the preceding section (Examples 1 and 2 and Comparative Experiments A to E) are carried out on the dried products thus obtained. Table 2 below shows the measurements obtained.

TABLE 2

| Example or Comparative Experiment | Material added | % by weight, based on ETFE | Test 1 Frothing | Test 1 Color | Test 2 Color | Test 2 % weight loss |
|---|---|---|---|---|---|---|
| F | $Cu(NO_3)_2$ | 0.2 | very severe | 5 | 3 | 0.15 |
| G | $CuCl_2$ | 0.2 | very severe | 5 | 3 | 1.11 |
| 3 | $Mg(H_2PO_3)_2$ | 0.2 | slight | 2 | 1 | 0.06 |
| H | — | — | severe | 4 | 3 | 0.9 |

EXAMPLES 4 AND 5 AND COMPARATIVE EXPERIMENT I 52 kg of an aqueous dispersion, diluted to 10% by weight solids content, of the copolymer of Example 1 are thickened, after adding 50 cm³ of concentrated hydrochloric acid, at 20° C. by means of an impeller stirrer and are wet-granulated, after addition of 4.2 liters of gasoline (boiling point 80° to 100° C.), whilst continuing the stirring, to a mean particle size of $d_{50}=500\mu$. After draining off the aqueous liquor, the product is washed three times with 35 liters of water for 5 minutes, whilst stirring. Thereafter, the moist polymer is washed with 20 liters of acetone and three times with 35 liters of water and is filtered off under slight suction. A moist product containing about 50% by weight of water is obtained, which is divided into three equal parts by weight. The first one-third of the moist product is dried, without further treatment, for 12 hours under nitrogen at 200° C. (Comparative Experiment I). The next one-third of the moist product is stirred with 24 liters of water, in which 51.4 grams of $Mg(H_2PO_3)_2$ are dissolved, for 5 minutes at 20° C., and is then filtered off under slight suction, giving a moist product containing about 50% by weight of constituents which are volatile under the drying conditions; this product is then dried for 12 hours under nitrogen at 200° C. (Example 4). The last one-third of the moist product is treated in the same way as described above, with the sole difference that 128.5 grams, instead of 51.4 grams, of $Mg(H_2PO_3)_2$ are dissolved in the 24 liters of water (Example 5). Standard bars according to ASTM-D 1708 are extruded from the dried products thus obtained and are then aged for 500 hours at 210° C., with exposure to air. Before and after aging, the following measurements according to ASTM-D 1708 are carried out on the standard bars: tensile strength (TS), yield stress (YS) and elongation at break (EB); in addition, the color of the bars was assessed visually in accordance with the color number scale given above. The values determined are shown in Table 3.

EXAMPLES 6 TO 9 AND COMPARATIVE EXPERIMENT J

The procedure followed is as described in the preceding section (Examples 4 and 5 and Comparative Experiment I), except that the moist product obtained after washing is divided into five equal parts by weight. The first one-fifth is dried, without further treatment, for 12 hours under nitrogen at 200° C. (Comparative Experiment J). The remaining fifths are each treated with 10 liters of water, in which the following amounts of various materials have first been dissolved as described in the preceding section:
second fifth: 11 g of $Mg(H_2PO_3)_2$ (Example 6);
third fifth: 44.1 g of $Al(H_2PO_3)_3$ (Example 7);
fourth fifth: 33.06 g of $Zn(H_2PO_3)_2$ (Example 8) and
fifth fifth: 22 g of $NaH_2PO_2$ (Example 9). After the treatment, the product is filtered off under slight suction, giving a moist product containing about 50% by weight of volatile constituents. This product is dried under nitrogen for 12 hours at 200° C. Standard bars according to ASTM-D 1708 are prepared from the products thus obtained and the measurements described in the preceding section are carried out on these. Equally, the color of the standard bars is assessed visually. The values determined are shown in Table 3 which follows.

In Examples 4 to 9 and Comparative Experiments I and J, the weight loss was furthermore determined on the aged standard bars. Values are shown in Table 3.

EXAMPLE 10

Magnesium phosphite $MgHPO_3$, precipitated in a fine form, is dried and again ground. The fine powder thus obtained is mixed in a fluid mixer, in the weight ratio of 1:1,200, with a copolymer which is also in the form of a dry fine powder and which consists of 50 mole % of tetrafluoroethylene units and 50 mole % of ethylene units. The mixture is fused and melt-extruded to give strands of 2 mm diameter. The product is aged for 86 hours at 200° C. The polymer stabilized and treated in this way has a white color even after aging and exhibits a weight loss of 0.11%. In contrast, an identical but unstabilized sample of this copolymer is yellowish in color and exhibits a weight loss of 0.31%.

EXAMPLE 11

A solution of 60 g of magnesium hydrogen phosphite $Mg(H_2PO_3)_2$ in 60 liters of water (0.1% strength by weight) is added to 18 kg of moist product containing 10 kg, expressed as solids, of a copolymer consisting of 50 mole % of tetrafluoroethylene units, 49.2 mole % of ethylene units, 0.7 mole % of hexafluoropropene units and 0.1 mole % of perfluoro-(propyl-vinyl)-ether units, after the last washing process; the whole is then stirred thoroughly with a high-speed stirrer for 20 minutes. Thereafter the slurry is allowed to settle out and the solid is separated off and dried for 12 hours at 200° C. Strips (10×150 mm, in bundles of 10 pieces), melt-extruded from this solid, are aged for 100 hours at 200° C. The samples stabilized in this way exhibit a white color after this treatment and have suffered a weight loss of 0.1%. Unstabilized samples treated in the same manner are also substantially white but exhibit a weight loss of 0.21%.

TABLE 3

| Example or Comparative Experiment | Material added | % by weight | Before aging ||||| After aging for 500 hours at 210° C. |||||
|---|---|---|---|---|---|---|---|---|---|---|---|
| | | | TS N/mm² | YS N/mm² | EB % | Color | TS N/mm² | YS N/mm² | EB % | Weight loss | Color |
| I | — | — | 40.7 | 31.5 | 160 | 1 | 25.0 | 25.0 | 40 | 3.71 | 4–5 |
| | | | 42.1 | 33.4 | 160 | | 23.6 | 23.6 | 35 | | |
| 4 | $Mg(H_2PO_3)_2$ | 0.2 | as for Comparative Experiment I | | | 1 | 36.0 | 33.4 | 130 | 0.1 | 1 |
| | | | | | | | 36.7 | 32.4 | 125 | | |
| 5 | $Mg(H_2PO_3)_2$ | 0.5 | as for Comparative Experiment I | | | 1 | 34.1 | 33.7 | 105 | 0.13 | 1 |
| | | | | | | | 35.3 | 33.0 | 100 | | |
| J | — | — | 39.5 | 31.8 | 150 | 1 | 22.0 | 23.0 | 45 | 2.95 | 4–5 |
| | | | 40.5 | 32.3 | 170 | | 21.1 | 22.6 | 30 | | |
| 6 | $Mg(H_2PO_3)_2$ | 0.1 | 39.1 | 32.1 | 150 | 1 | 32.6 | 31.6 | 90 | 0.23 | 2 |
| | | | 40.2 | 32.7 | 160 | | 33.4 | 33.9 | 95 | | |
| 7 | $Al(H_2PO_3)_3$ | 0.4 | as for Example 6 | | | 1 | 33.2 | 31.6 | 140 | 0.14 | 1 |
| | | | | | | | 34.7 | 32.0 | 130 | | |
| 8 | $Zn(H_2PO_3)_2$ | 0.3 | as for Example 6 | | | 1 | 34.2 | 30.1 | 120 | 0.12 | 1 |
| | | | | | | | 34.7 | 31.6 | 125 | | |
| 9 | $NaH_2PO_2$ | 0.2 | as for Example 6 | | | 1 | 28.6 | 28.3 | 90 | 0.25 | 3 |
| | | | | | | | 27.4 | 26.9 | 105 | | |

The amounts of component (b) contained in the mixtures according to the invention can be determined analytically either with the aid of the X-ray fluorescence method, by measuring the $K_\alpha$ line of phosphorus, or by means of a spectrophotometric process; in the latter, the copolymer containing component (b) is oxidatively decomposed and a molybdate solution is added. The extinction of the phosphorus-molybdenum blue thus produced is determined spectrophotometrically and the phosphorus content or amount of component (b) is calculated therefrom.

We claim:

1. A mixture comprising:
   (a) 99.999 to 98% by weight, calculated on the mixture, of at least one ethylene-tetrafluoroethylene copolymer which in addition to polymerized ethylene and tetrafluoroethylene units can contain further polymerized units, derived from monomers which are copolymerizable with tetrafluoroethylene, and
   (b) 0.001 to 2% by weight, calculated on the mixture, of at least one metal salt of an acid of phosphorus selected from the group consisting of phosphorous acid $H_2(HPO_3)$, diphosphorous acid $H_2(H_2P_2O_5)$, hypodiphosphorous acid $H_2(H_2P_2O_4)$, and hypophosphorous acid $H(H_2PO_2)$, or mixtures thereof wherein the cation of that metal salt is a metal cation of the first to third main group of the periodic table of the elements, zinc or manganese.

2. A mixture according to claim 1, which comprises 99.99 to 98% by weight of component (a) and 0.01 to 2% by weight of component (b).

3. A mixture according to claim 1, which contains a copolymer comprising from 40 to 70 mole %, relative to the copolymer, of polymerized ethylene units.

4. A mixture according to claim 1 or 2, which contains a copolymer comprising polymerized ethylene units and tetrafluoroethylene units and up to 10 mole%, relative to the copolymer, of further units which are derived from at least one ethylenically monounsaturated monomer which is copolymerizable with tetrafluoroethylene and does not act as a telogen.

5. A mixture according to claim 1, which contains at least one metal salt of phosphorous acid.

6. A mixture according to claim 5, which contains at least one magnesium, calcium or aluminum salt of phosphorous acid.

7. A process for the preparation of a mixture according to claim 1, wherein, after preparation of component (a) of the mixture by copolymerization of the corresponding monomers in emulsion or suspension, component (b) of the mixture is added when working up the copolymer.

8. A process according to claim 7, wherein component (b) of the mixture is added as an aqueous solution.

9. A process according to claim 7, wherein 0.01 to 3% by weight of component (b) of the mixture are dissolved or dispersed in water, at most 1 part by weight of the copolymer is treated, after the last washing, with 1 part by weight of this solution or dispersion and thereafter excess solution is again separated off, so that a moist product results which contains about 40 to 60% by weight, relative to the moist product, of the copolymer, after which the moist product is dried at temperatures of up to 220° C.

10. The process of claim 9 wherein said drying is carried out in the presence of an inert gas or under reduced pressure or both.

11. The process of claim 9 wherein the dried product is melt-granulated.

12. A wire having a coating consisting essentially of the mixture of claim 1.

* * * * *